United States Patent [19]
Christensen et al.

[11] Patent Number: 6,163,208
[45] Date of Patent: Dec. 19, 2000

[54] ONE BIT DIGITAL PHASE SHIFT KEYED CARRIER RECOVERY AND DEMODULATOR CIRCUIT

[75] Inventors: Craig L. Christensen; Kenneth L. Reinhard; Andrei Rudolfovich Petrov, all of Pocatello, Id.

[73] Assignee: Ga-Tek Inc., Eastlake, Ohio

[21] Appl. No.: 09/211,550

[22] Filed: Dec. 15, 1998

[51] Int. Cl.[7] .............................. H03D 3/18; H03D 3/00
[52] U.S. Cl. .................... 329/304; 329/307; 329/310; 331/12; 375/326; 375/331; 375/327; 375/329
[58] Field of Search .................................. 329/304, 306, 329/307, 309, 310; 331/12, 45; 327/159; 455/255, 260; 375/332, 326, 327, 329, 328, 324, 331

[56] References Cited

U.S. PATENT DOCUMENTS

| 5,121,070 | 6/1992 | Tomita ..................................... 329/304 |
| 5,241,567 | 8/1993 | Shimakata ............................... 329/307 |
| 5,355,092 | 10/1994 | Kosaka et al. .......................... 329/304 |
| 5,625,652 | 4/1997 | Petranovich ............................ 375/355 |

*Primary Examiner*—Arnold Kinkead
*Attorney, Agent, or Firm*—Renner, Otto, Boisselle & Sklar LLP

[57] ABSTRACT

A phase shift keyed carrier recovery and demodulator circuit which includes a phase detector and subsequent feedback control loop circuitry which maintains an initial phase relationship. By comparing an incoming phase modulated carrier with the multiple phase outputs of a local oscillator, the circuit is able to generate a correcting signal which allows coherent phase tracking of the incoming phase modulated carrier. The phase detector produces a correction signal which allows the circuit to phase lock any two sequential phases of the locally generated phase outputs to phase positions on either side of the phase of the incoming phase modulated carrier. Once the circuit has obtained carrier phase lock, the multiple phases produced by the local oscillator will remain fixed (without phase change) relative to the initial detected phase of the incoming phase modulated carrier. Since the local oscillator is fixed (locked) to the phase of the incoming phase modulated carrier, demodulation can be accomplished simply by clocking one or more flip flops with respective phases of the local oscillator.

18 Claims, 6 Drawing Sheets

ONE BIT DIGITAL PHASE SHIFT KEYED CARRIER RECOVERY AND DEMODULATOR CIRCUIT

TECHNICAL FIELD

The present invention relates generally to a phase shift keyed demodulator circuit. More particularly, the present invention relates to a phase shift keyed demodulator circuit which uses digital techniques to lock to a phase of a modulated carrier and to decode the data.

BACKGROUND OF THE INVENTION

A variety of modulation techniques for transmitting digital data on a modulated carrier are known in the field of data communications. For example, one such modulation technique is referred to as phase shift keying (PSK). The phase of the carrier is modulated based on the digital data being transmitted. By detecting the phase of the modulated carrier, it is then possible to recover the digital data from the received carrier.

Binary phase shift keying (BPSK) and quaternary phase shift keying (QPSK) represent two very common forms of PSK modulation. Digital data is encoded as biphase or quadriphase phase changes of a carrier frequency (hereinafter referred to simply as the "carrier"). The recovery of the data requires a carrier-coherent signal for demodulation.

BPSK and QPSK demodulator circuits have been typically constructed with a significant number of analog components. For example, the demodulator circuits usually have included an assortment of analog mixers, summers, oscillators, phase detectors and filters. The number and type of analog components used to construct such a demodulator has been costly and required excessive circuit board space. In addition, significant design effort has been necessary in order to ensure operational compatibility of the various analog components. Digital BPSK and QPSK demodulator circuits have been known to exist. However, these demodulators have been relatively complex and operation intensive.

In view of the foregoing shortcomings associated with conventional PSK demodulators, there is a strong need in the art for a demodulator which utilizes simple digital techniques in lieu of more costly and complex analog and digital designs. Moreover, there is a strong need for such a demodulator that offers a simple construction which can be incorporated easily within an integrated circuit.

SUMMARY OF THE INVENTION

The present invention represents a one bit phase shift keyed carrier recovery and demodulator circuit, generally referred to herein as a "demodulator". The demodulator uses digital techniques to lock to a phase of a modulated carrier and to decode the data. Consequently, the present invention avoids the need for more costly and complex analog circuitry. The demodulator has a simple construction and may be incorporated easily within an integrated circuit.

Operation of the demodulator is based on maintaining the phase relationship between the incoming phase modulated carrier and at least two phases of a locally produced multiphase oscillator. Specifically, the demodulator includes a phase detector and subsequent feedback control loop circuitry which attempts to maintain the phase relationship. By comparing the incoming phase modulated carrier with the multiple phase outputs of the local oscillator, the demodulator is able to generate a correcting signal which allows coherent phase tracking of the incoming phase modulated carrier.

The phase detector produces a correction signal which allows the demodulator to phase lock any two sequential or consecutive phases of the locally generated phase outputs to phase positions on either side of the phase of the incoming phase modulated carrier. Once the demodulator has obtained carrier phase lock, the multiple phases produced by the local oscillator will remain fixed (without phase change) relative to the initial detected phase of the incoming phase modulated carrier. Since the local oscillator is then fixed (locked) to the initial detected phase of the incoming phase modulated carrier, demodulation can be accomplished simply by clocking one or more flip flops with respective phases of the local oscillator.

According to one particular aspect of the invention, a digital phase shift keyed carrier recovery and demodulator circuit is provided. The circuit includes an input for receiving an incoming phase modulated carrier and a local oscillator for generating a reference frequency as a function of a control signal, the local oscillator providing as outputs a plurality of phases of the reference frequency. The circuit further includes a phase detector and feedback loop, operatively coupled to the input and the local oscillator, for comparing a phase of the incoming phase modulated carrier with the plurality of phases of the reference frequency, for producing the control signal based on the phase comparison initially to phase lock edges of any two consecutive phases of the plurality of phases to phase positions on respective sides of a corresponding edge of the incoming phase modulated carrier, and wherein the control signal as produced by the phase detector and feedback loop is thereafter generally insensitive to phase changes in the incoming phase modulated carrier due to data phase modulation and a demodulation circuit for producing at least one output signal representing phase modulated bit data based on the outputs of the local oscillator and the incoming phase modulated carrier.

According to another aspect of the invention a digital phase keyed shift carrier recovery and demodulator circuit is provided which includes an input for receiving an incoming N phase modulated carrier, where N is an integer greater than or equal to 2 a local oscillator for generating a reference frequency, the local oscillator providing as outputs at least N phases of the reference frequency a phase detector and feedback loop, operatively coupled to the input and the local oscillator, for synchronizing the local oscillator to the modulated carrier so as to maintain an initial phase relationship between corresponding edges of two consecutive phases of the N output phases and an edge of the modulated carrier in which the edge of the modulated carrier is generally centered in phase relationship between the corresponding edges of the two consecutive phases; and a demodulation circuit for producing at least one output signal representing phase modulated bit data by detecting subsequent changes in the phase of the modulated carrier based on a comparison of the modulated carrier and the outputs of the local oscillator.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DESCRIPTION OF THE PREFERRED EMBODIMENTS

Figure 1:
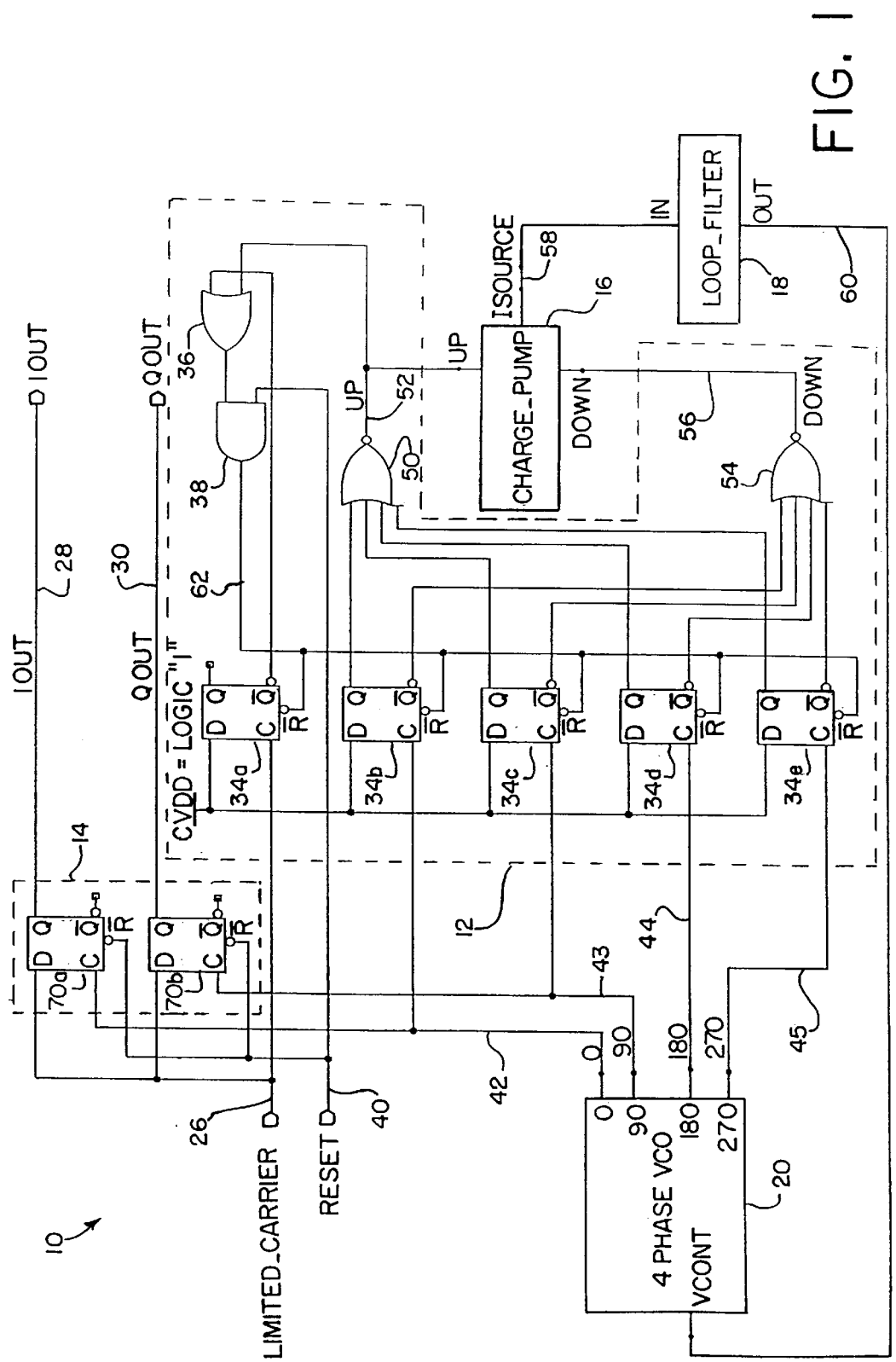
FIG. 1 is a schematic diagram of a one bit digital quaternary phase shift keyed carrier recovery and demodulator circuit in accordance with a first embodiment of the present invention.

The present invention will now be described with reference to the drawings, wherein like reference numerals are used to refer to like elements throughout.

Referring initially to FIG. 1, a QPSK carrier recovery and demodulator circuit according to a first embodiment of the present invention is generally designated as 10. Generally speaking, the demodulator 10 receives an incoming phase modulated carrier which has been amplitude limited to one bit (binary) digital logic levels. The demodulator 10 locks itself to the initial phase of the carrier and thereafter demodulates QPSK data from the carrier. Specifically, the demodulator 10 outputs symbol data in the form of I and Q signals.

In the exemplary embodiment, the demodulator 10 includes a quadrature phase detector 12, a demodulation circuit 14 and a balanced current charge pump 16. In addition, the demodulator 10 includes a loop filter 18 and a local voltage-controlled oscillator (VCO) 20 with four 90° phase offset outputs. The demodulator 10 is designed to receive an incoming phase modulated carrier (LIMITED_CARRIER) on line 26. As mentioned above, the incoming phase modulated carrier on line 26 previously has been previously amplitude limited to binary digital logic levels using conventional techniques. The demodulator 10 in turn outputs the demodulated I and Q signals (IOUT and QOUT) onto lines 28 and 30, respectively.

As will be described more fully below, the demodulator 10 operates based on the phase detector 12, charge pump 16, and loop filter 18 serving as a feedback control loop to maintain an initial phase relationship between the incoming LIMITED_CARRIER and any two sequential or consecutive phase outputs of the local oscillator 20. The phase detector 12 compares four phase signals output by the local oscillator 20, and which have relative phase relationships of 0, 90, 180 and 270 degrees, to the incoming LIMITED_CARRIER. The phase detector 12 is, in turn, able to generate a correction signal which allows coherent phase tracking of the incoming LIMITED_CARRIER.

Specifically, the phase detector 12 produces a correction signal which allows the demodulator 10 initially to lock any two sequential phase outputs of the local oscillator 20 to phase positions equidistant from and on either side of the incoming LIMITED_CARRIER phase. The QPSK demodulator lock point is ±45 degrees on either side of the incoming LIMITED_CARRIER phase, but could be adjusted so the lock point is not equidistant between the phases if necessary. Because the phase detector 12 compares the incoming LIMITED_CARRIER phase to all four phases produced by the local oscillator 20, the phase detector 12 is insensitive to both 90 degree and 180 degree phase changes of the incoming LIMITED_CARRIER. Thus, if the phase of the LIMITED_CARRIER changes due to a data change (which occurs in 90 degree and 180 degree increments), the phase of the incoming LIMITED_CARRIER will move to a new position equidistant between two different phases of the local oscillator 20. The correction signal produced by the phase detector 12 therefore remains the same irrespective of which of the locally generated phases the incoming LIMITED_CARRIER phase falls between. The phase detector 12 will continue to produce correct tracking information as the phase of the incoming LIMITED_CARRIER is switched between any two of the four phases generated by the local oscillator 20.

It will therefore be appreciated that once the demodulator 10 has obtained initial phase lock to the incoming LIMITED_CARRIER, the four phases of the local oscillator 20 will remain fixed (without phase changes) relative to the initial detected phase of the carrier. This allows the demodulation circuit 14 to demodulate the phase data simply using a pair of flip flops as will be described further below. The construction of the demodulator 10 allows the phase difference between the local oscillator 20 and the incoming LIMITED_CARRIER to vary by almost ±45 degrees and still demodulate the data correctly.

Describing the demodulator 10 in more detail, the phase detector 12 in the exemplary embodiment is made up of five rising-edge triggered D-type flip flop circuits with resets. The D-type flip flops are labeled as 34a–34e, respectively. Each of the flip flops 34a–34e has its data (D) input connected to a fixed logical "1" connection. The incoming LIMITED_CARRIER on line 26 is connected to the clock (C) input of the first flip flop 34a. The inverted (Q-bar) output of flip flop 34a is coupled to one input of a logical OR gate 36. The output of the logical OR gate 36 is coupled through one input of a logical AND gate 38 to the inverted reset (R-bar) input of each of the flip flops 34a thru 34e. The other input of the AND gate 38 is coupled to a system control RESET signal via line 40. During operation of the demodulator 10, the RESET signal on line 40 is maintained at a logic "1" level. Accordingly, the output of the logical OR gate 36 is effectively coupled directly to the reset inputs of the flip flops 34a thru 34e.

The local oscillator 20 in the present embodiment is a four phase VCO. The local oscillator 20 is configured to produce four different outputs on lines 42–45 which have respective phases of 0, 90, 180 and 270 degrees relative to the oscillating frequency of the oscillator 20. The 0 degree phase output on line 42 is coupled to the clock (C) input of flip flop 34b. Similarly, the 90, 180 and 270 degree outputs on lines 43–45 are respectively coupled to the clock inputs (C) of the remaining flip flops 34c thru 34e.

The non-inverted (Q) output of each of these phase detector flip flops 34b thru 34e is coupled to a corresponding input of a four-input logical NOR gate 50. The output of the NOR gate 50 represents an "UP" correction signal on line 52 which is input to the charge pump 16. In addition, the output of the NOR gate 50 is coupled to the second input of the OR gate 36. As discussed further below, the OR gate 36 is used to decrease the local oscillator start-up time by preventing frequent resets of the phase detector 12 when the carrier is running much faster than the local oscillator 20. This allows the "UP" pulses to be much wider than they would otherwise be.

Similarly, the inverted (Q-bar) output of each of the flip flops 34b thru 34e is coupled to a corresponding input of a four-input logical NOR gate 54. The output of the NOR gate 54 represents a "DOWN" correction signal on line 56 which is input to the charge pump 16. In the exemplary embodiment, the charge pump 16 is configured so that the magnitude of the output currents produced on line 58 in response to the UP and DOWN correction signals are equal and opposite at the lock point, thereby resulting in zero net correction. The output from the charge pump 16 on line 58 is passed through the loop filter 18. The loop filter 18 integrates the output on line 58 to produce a voltage on line 60 which varies in accordance with the output from the charge pump 16. The output on line 60 in turn serves as the voltage control input to the local oscillator 20.

Accordingly, during operation the demodulator 10 will receive the incoming LIMITED_CARRIER on line 26 which serves as the clock signal for the flip flop 34a. With each rising edge of the LIMITED_CARRIER, the logic "1" data at the D input is clocked into the flip flop 34a and the Q-bar output of the flip flop 34a goes to a logic "0" level. This logic "0" level is input to the OR gate 36 so as to produce a logic "0" at the input of the AND gate 38 if the "UP" correction signal on line 52 is also low. Consequently, the logic "0" is passed onto line 62 at the output of the AND gate 38 (the RESET signal on line 40 being fixed at a logic "1" level during operation).

The logic "0" output of the OR gate 36 is thereby provided to the R-bar reset input of each of the flip flops 34a thru 34e. The logic "0" at the R-bar input resets the respective flip flops 34a thru 34e, and the Q-bar output of the flip flop 34a thus returns to a logic "1" level a short time following the rising edge of the LIMITED_CARRIER. As will be appreciated, such short time will be governed largely by the propagation delay of the OR gate 36 and the AND gate 38. Consequently, with each rising edge of the LIMITED_CARRIER the phase detector 12 generates a reset pulse which resets each of the flip flops 34a thru 34e.

The flip flop 34b is used to compare the rising edge of the 0 degree phase signal from the local oscillator 20 to the rising edge of the LIMITED_CARRIER as identified by the reset pulse provided to the R-bar input. If the rising edge of the 0 degree phase signal on line 42 precedes the rising edge of the LIMITED_CARRIER, the logic "1" level data input will be clocked into the flip flop 34b prior to the flip flop being reset. This results in the flip flop 34b presenting Q=1 and Q-bar=0 pulses at its outputs. Consequently, the Q output of the flip flop 34b will preclude an "UP" control pulse from being provided to the charge pump 16 via the NOR gate 50 at such time. The charge pump 16 may or may not receive a "DOWN" control pulse via the NOR gate 54 at such time depending on the state of the other flip flops 34c thru 34e.

If the rising edge of the 0 degree phase signal on line 42 follows the rising edge of the LIMITED_CARRIER, on the other hand, the flip flop 34b will be reset. This results in the flip flop 34b presenting Q=0 and Q-bar=1 pulses at its outputs. Consequently, the Q-bar output of the flip flop 34b will preclude a "DOWN" control pulse from being provided to the charge pump 16 at such time. The charge pump 16 may or may not receive a "UP" control pulse at such time depending on the state of the other flip flops 34c thru 34e.

Similarly, the flip flops 34c thru 34e compare the rising edge of the LIMITED_CARRIER with the rising edge of the respective phase signals produced by the local oscillator 20. If the rising edge of the respective phase signal precedes the rising edge of the incoming LIMITED_CARRIER, the particular flip flop will produce outputs of Q=1 and Q-bar=0 pulses which enables a "DOWN" control pulse to be provided to the charge pump 16. Conversely, if the rising edge of the respective phase signal follows the rising edge of the incoming LIMITED_CARRIER, the particular flip flop will produce outputs of Q=0 and Qbar =1 pulses which enables an "UP" control pulse to be provided to the charge pump 16. In the event an "UP" control pulse is provided to the charge pump 16, this logic "1" level pulse precludes the input to the R-bar reset input of the flip flops 34a thru 34e from going active during such time. This aids in initial synchronization preventing frequent resets of the phase detector 12 when the local oscillator 20 is running slower than the limited carrier frequency. The "UP" pulses will be much wider in this condition.

Consequently, during such time as the LIMITED_CARRIER is initially received (e.g., during a predefined synchronization period), the phase detector 12 will tend to adjust the frequency and phase of the local oscillator 20 so as to achieve a balanced condition relative to the LIMITED_CARRIER. In the balanced condition, the rising edge of the LIMITED_CARRIER is centered between the rising edges of any two consecutive phases of the local oscillator 20 (i.e., 0° and 90°, 90° and 180°, 180° and 270° or 270° and 0°), and the phase detector 12 will produce an "UP" control pulse on line 52 followed by a "DOWN" control pulse on line 56 each ⅛th of the carrier cycle in duration. The "UP" and "DOWN" control pulses are centered around the rising edge of the of the LIMITED_CARRIER.

When the timing of the output phases of the local oscillator 20 relative to the phase of the LIMITED_CARRIER is in the balanced condition, equal "UP" and "DOWN" control pulses in time and amplitude will produce a zero net change in the filtered voltage provided to the local oscillator 20 on line 60. If there is an imbalance in the phases, the phase detector 12 produces non-symmetrical "UP" and "DOWN" control pulse pairs. These unbalanced pulse pairs, when filtered by the filter 18, produce a correcting change in the control voltage on line 60 which pulls the loop back into balance. In this manner, the demodulator 10 will naturally be driven towards the balanced condition.

Figure 1A:
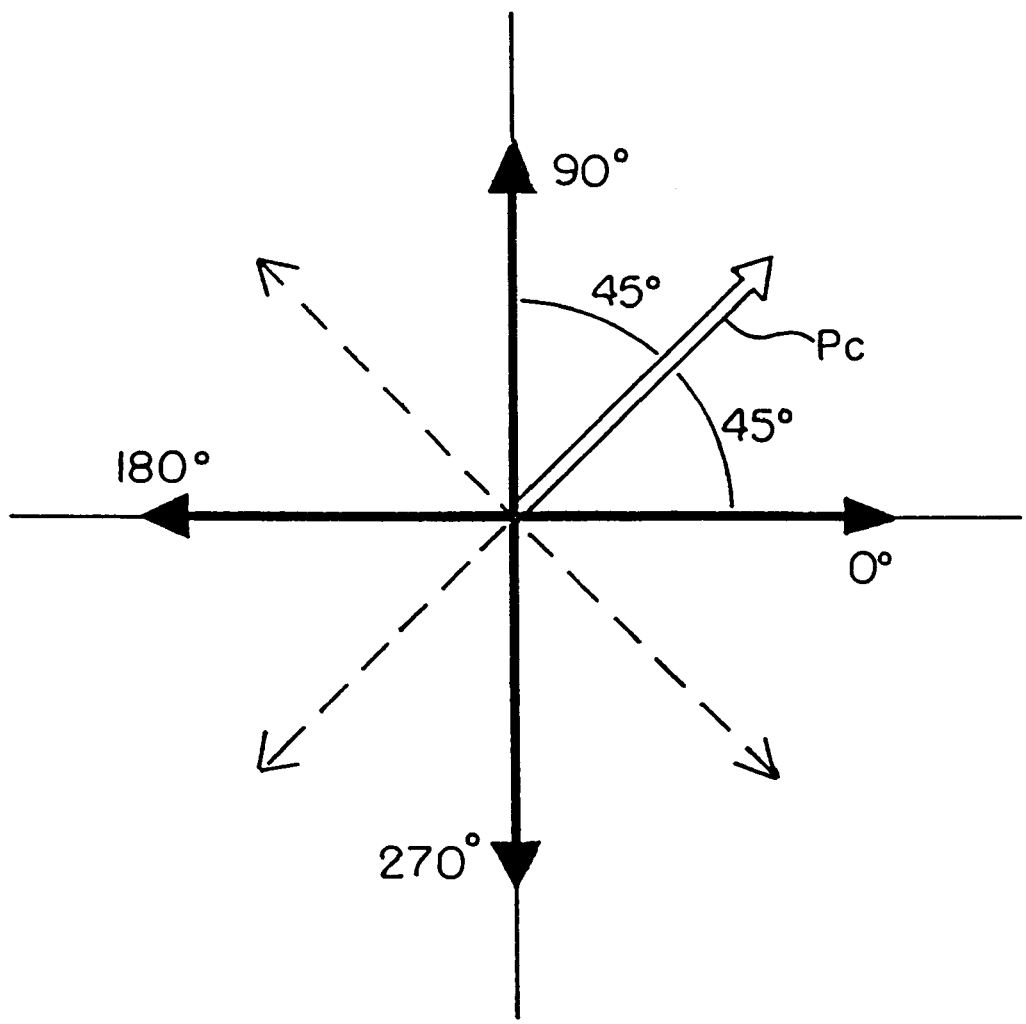
FIG. 1A is a phase diagram illustrating the phase relationship between the local oscillator in the circuit of FIG. 1 and the quatenary phase modulated carrier.

FIG. 1A illustrates how the phase Pc of the LIMITED_CARRIER will tend to become balanced between two consecutive phases of the local oscillator 20. In the illustrated example, the phase Pc happens to balance between the 0 degree and 90 degree phases of the local oscillator 20. Notably, however, the phase Pc of the LIMITED_CARRIER may then change as a result of modulated data by 90 degrees or 180 degrees (as represented in phantom), yet still remain balanced between two consecutive phases of the local oscillator 20. Hence, the phase detector 12 will remain balanced despite the change in phase of the LIMITED_CARRIER. In other words, the phase detector 12 will continue to provide equal "UP" and "DOWN" control pulses in time and amplitude which will produce a zero net change in the filtered voltage provided to the local oscillator 20 on line 60. The four phases of the local oscillator 20 will therefore remain fixed or locked (without phase change) relative to the initially detected phase of the LIMITED_CARRIER (e.g., the phase lock obtained during initial synchronization).

Upon the different phases of the local oscillator 20 being fixed to the initial phase of the LIMITED_CARRIER by achieving the aforementioned balanced condition, the carrier may then be demodulated. Specifically, the demodulation circuit 14 includes a pair of demodulating D-type flip flops 70a and 70b. Any consecutive pair of the output phases from the local oscillator 20, such as the 0 degree and 90 degree phase outputs, respectively, may be used to clock the flip flops 70a and 70b as shown in FIG. 1. The LIMITED_CARRIER on line 26 is input to the D input of each of the flip flops 70a and 70b. When clocked by the quadrature-phased outputs, the flip flops 70a and 70b will produce the demodulated digital level I and Q signals at their respective Q outputs at lines 28 and 30.

It will be appreciated that the response of the loop filter 18 will determine how quickly the demodulator 10 initially achieves balance during synchronization; however, as with other phase lock loops the design of the loop filter 18 and the overall feedback loop response must balance performance factors associated with dynamic signal phase acquisition and tracking with those of smoothing the input signal phase jitter due to noise in the amplitude limiter. The phase detector 12 effectively removes the input data modulation transitions correctly as long as the instantaneous tracking error does not exceed the ±45 degree limits indicated previously.

Figure 2:
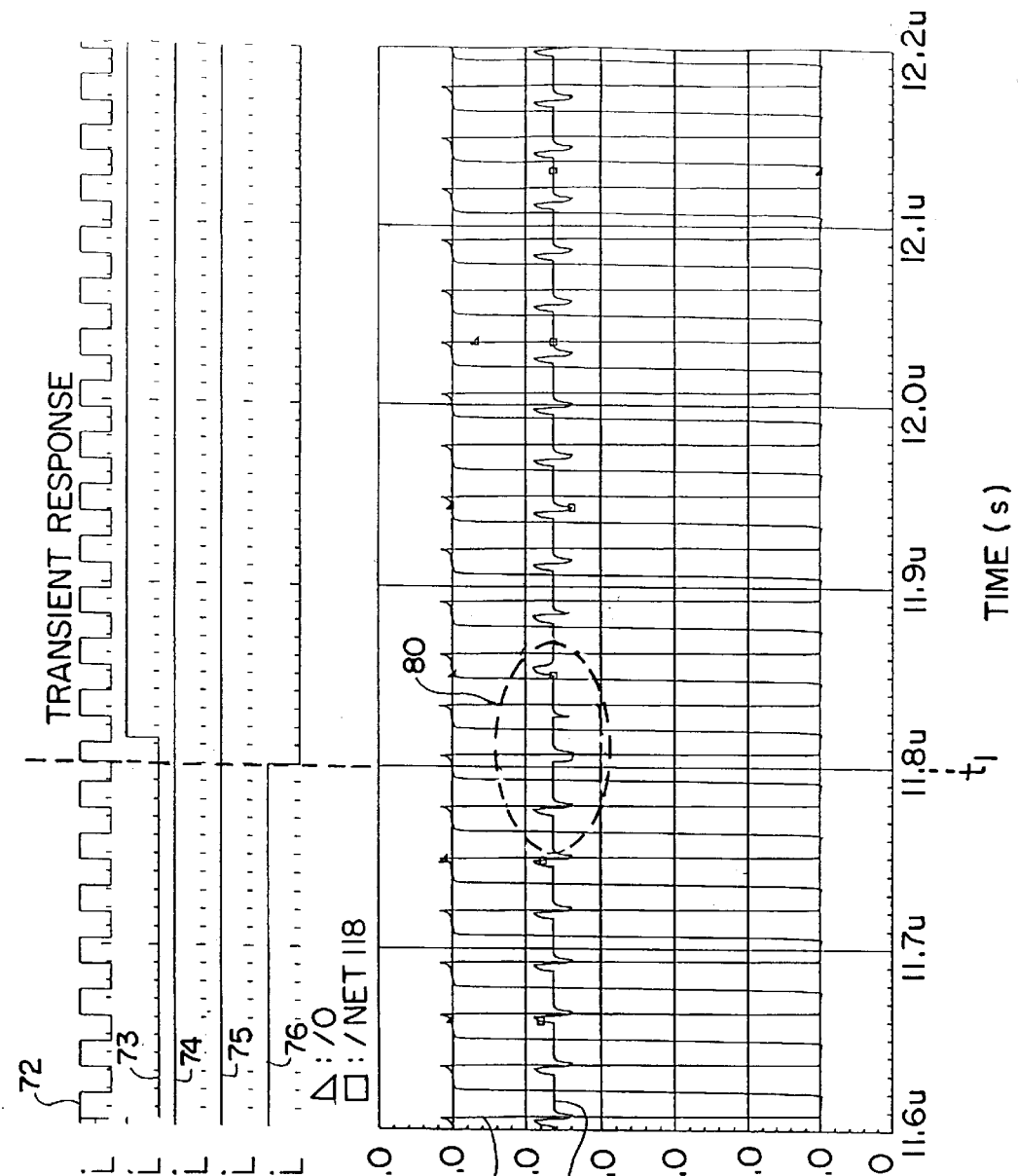
FIGS. 2 and 3 are timing diagrams illustrating the operation of the circuit shown in FIG. 1 in accordance with the present invention.
Figure 3:
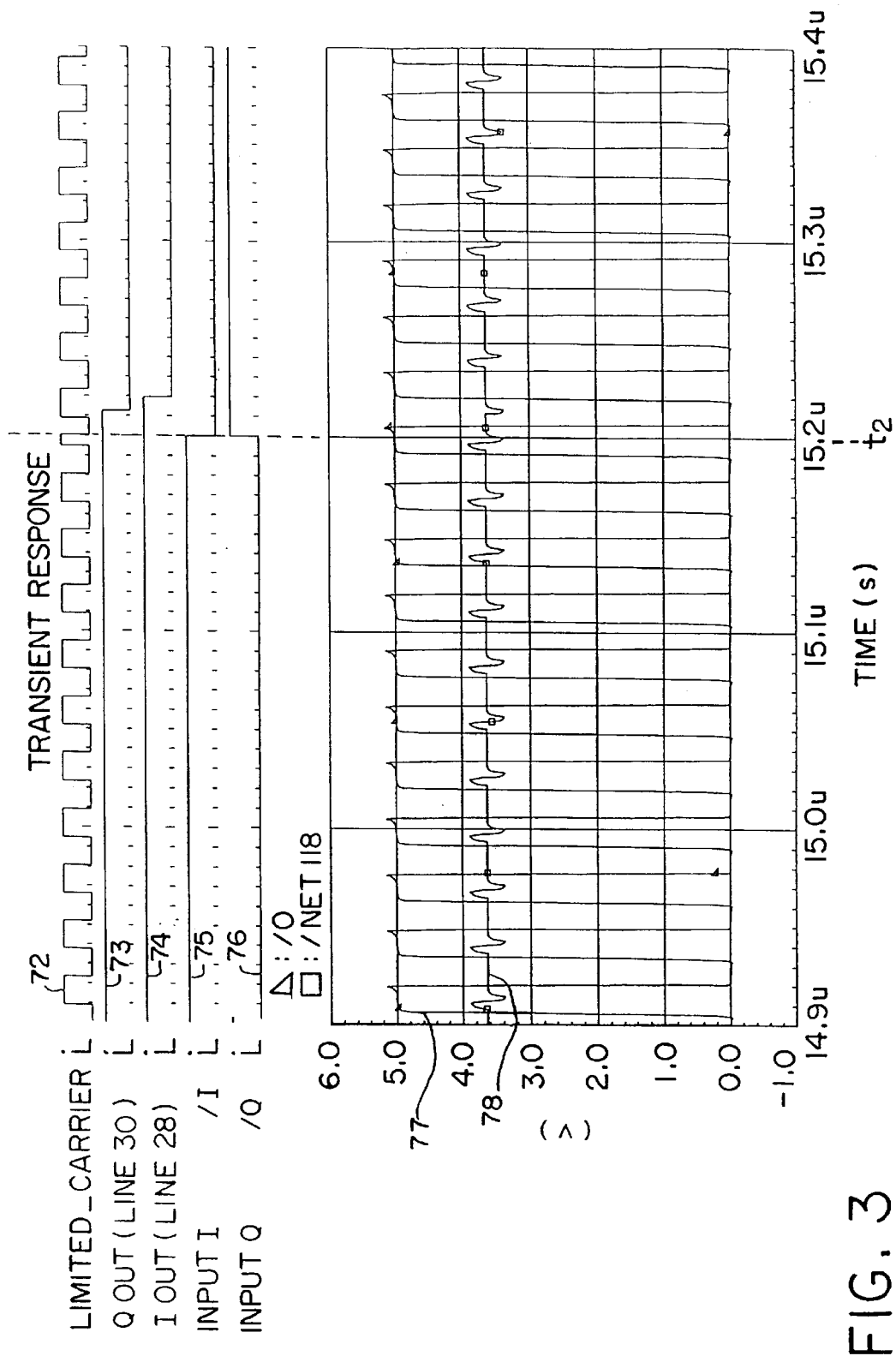

Referring now to FIGS. 2 and 3, a timing diagram is shown illustrating the operation of the demodulator 10. Waveform 72 denotes the amplitude limited carrier signal LIMITED_CARRIER. Waveforms 73 and 74 represent the demodulated Q and I signals on lines 30 and 28 (FIG. 1), respectively. Waveforms 75 and 76 represent the data signals which have been modulated onto the LIMITED_CARRIER by the device transmitting the modulated carrier (not shown). Waveform 77 represents the 0 degree phase output of the local oscillator 20. Finally, waveform 78 represents the output of the charge pump 16 at line 58 (FIG. 1).

As is shown in FIG. 2, prior to time t1 the demodulator 10 locks to the phase of the incoming LIMITED_CARRIER by achieving the afore described balanced condition. At time t1, the phase of the LIMITED_CARRIER is changed via QPSK modulation by altering the value of Q as represented by waveform 76. As is shown in waveform 72, the LIMITED_CARRIER resultantly changes in phase at time t1.

Nevertheless, as illustrated in the region 80 before and after time t1, the phase of the local oscillator waveform 77 does not change despite the change in phase of the LIMITED_CARRIER. As is indicated by the waveform 78 illustrating the output of the charge pump 18, the phase detector 12 tends to float through the phase change and hence remains locked on the initial phase relationship. There is a slight imbalance in the "UP" and "DOWN" control pulses which are delivered to the charge pump 16 and hence the output represented by waveform 78 becomes nonsymmetrical. However, such error is represents a small aberration which is filtered by the loop filter 18 so as to have little or no effect on the overall phase of the local oscillator 20. Waveform 73 illustrates how the change in the value of Q is then reflected in the demodulated data.

FIG. 3 illustrates how at time t2 the values of both I and Q are changed on the modulated LIMITED_CARRIER. Again it is noted in waveform 73 how the LIMITED_CARRIER consequently undergoes a phase change at time t2 yet the local oscillator 20 remains locked on the initial phase. Consequently, the demodulation circuit is able to output the new values of I and Q as represented by waveforms 74 and 73, respectively.

As will be appreciated, the principles of the present invention can be applied to various other PSK techniques including BPSK, 8-PSK, 16-PSK, etc. The primary difference is the number of flip flops in the phase detector and the demodulation circuit.

Figure 4:
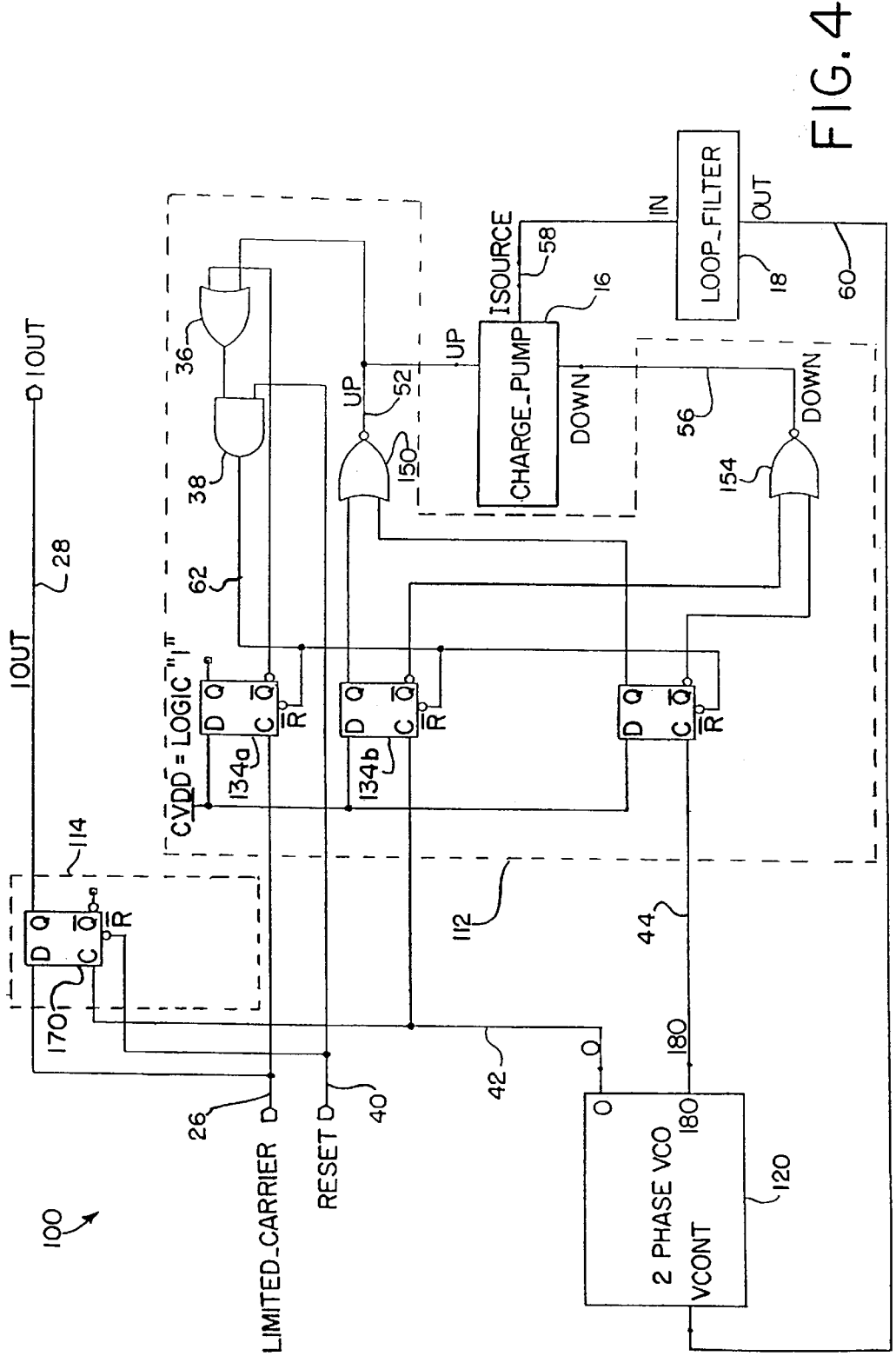
FIG. 4 is a schematic diagram of a one bit digital binary phase shift keyed carrier recovery and demodulator circuit in accordance with a second embodiment of the present invention.

Turning now to FIG. 4, a BPSK embodiment of the carrier recovery and demodulator circuit of the present invention is denoted as 100. Much of the configuration and principles of operation is identical to the QPSK demodulator 10 discussed above. Accordingly, only the significant differences will be discussed herein.

Namely, the demodulator 100 includes a local oscillator 120 which provides two equally spaced phase outputs rather than four. For example, the local oscillator 120 provides relative phase outputs of 0 and 180 degrees on lines 42 and 44, respectively. The phase detector 112 includes three D-type flip flops 134a–134c rather than five as in the embodiment of FIG. 1. Analogous to the flip flop 34a in FIG. 1, the flip flop 134a in the demodulator 100 produces a reset pulse which is delivered to each of the flip flops 134a thru 134c in response to the rising edge of the LIMITED_CARRIER. The flip flop 134b compares the phase of the LIMITED_CARRIER with the 0 degree phase output of the local oscillator 120, and the flip flop 134c compares the phase of the LIMITED_CARRIER with the 180 degree phase output of the local oscillator 120.

The Q output of each of the flip flops 134b and 134c is provided to a respective input of a two-input logical NOR gate 150. Similarly, the Q-bar output of each of the flip flops 134b and 134c is provided to a respective input of a two-input logical NOR gate 154. The NOR gates 150 and 154 produce the "UP" and "DOWN" control pulses in the same manner discussed above in relation to the NOR gates 50 and 54.

Figure 4A:
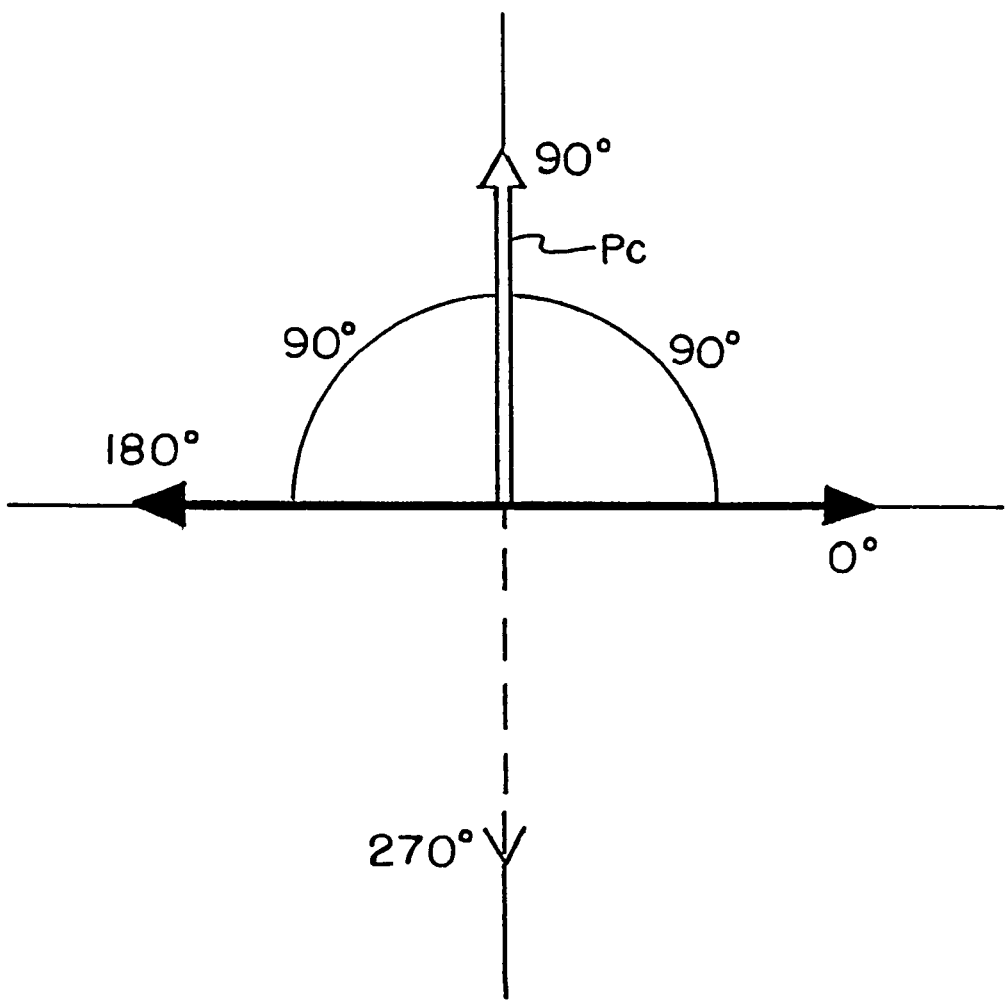
FIG. 4A is a phase diagram illustrating the phase relationship between the local oscillator in the circuit of FIG. 4 and the binary phase modulated carrier.

Since only two phases are involved, the demodulator 100 will initially settle in a balanced condition as represented in FIG. 4A. Specifically, the balance of the "UP" and "DOWN" control pulses will result in the phase Pc of the LIMITED_CARRIER tending to become balanced between two consecutive phases of the local oscillator 120. In the illustrated example, the phase Pc happens to balance at 90 degrees between the 0 degree and 180 degree phases of the local oscillator 120 (e.g., at ±90 degrees relative to the phases of the local oscillator). Notably, however, the phase Pc of the LIMITED_CARRIER may then change as a result of modulated data by 180 degrees (as represented in phantom), yet still remain balanced between two consecutive phases of the local oscillator 120. Hence, the phase detector 112 will remain balanced despite the 180 degree change in phase of the LIMITED_CARRIER. In other words, the phase detector 112 will continue to provide equal "UP" and "DOWN" control pulses in time and amplitude will produce a zero net change in the filtered voltage provided to the local oscillator 120 on line 60. The two phases of the local oscillator 120 will therefore remain fixed or locked (without phase change) relative to the initially detected phase of the LIMITED_CARRIER (e.g., the phase lock obtained during initial synchronization).

Upon the phases of the local oscillator 120 being fixed to the initial phase of the LIMITED_CARRIER by achieving the aforementioned balanced condition, the carrier may then be demodulated. Specifically, the demodulation circuit 114 includes a demodulating D-type flip flop 170. Any one of the output phases from the local oscillator 120 may be used to clock the flip flop 170, such as the 0 degree phase output as shown in FIG. 4. The LIMITED_CARRIER on line 26 is input to the D input of the flip flop 170. When clocked by the phase output, the flip flop 170 will produce the demodulated digital level I signal at its Q output at line 28.

It will therefore be appreciated that the present invention greatly simplifies the construction of a coherent PSK demodulator. Although the limited input carrier zero crossing transition times can vary over a continuum of (analog) values, the entire circuit is primarily digital, and can be contained within one integrated circuit. All functions within the demodulator, which includes the phase detector, data demodulation circuit, charge pump, loop filter and local oscillator, can be constructed of standard discrete components or incorporated within an integrated circuit constructed in any number of technologies. The demodulator is capable of operation across a wide range of carrier frequencies limited primarily only by the frequency range of the digital logic.

The demodulator tends to center, or lock, the edge of the incoming modulated carrier between the edges of two different phases of the locally generated oscillator frequency. This synchronization or phase lock of the edge of the modulated carrier between two of the locally generated phases allows the demodulator to maintain tracking with respect to the initial phase of the modulated carrier even if there is a subsequent phase change. Simple flip flops may then be used to demodulate the data. Conventional phase detectors are configured to match the edges of the incoming modulated carrier with the locally generated oscillator frequency. Thus, more complex circuitry has been necessary in order to maintain tracking of the initial carrier phase in the event of a data modulation phase change.

Although the invention has been shown and described with respect to certain preferred embodiments, it is obvious that equivalents and modifications will occur to others skilled in the art upon the reading and understanding of the specification. For example, the invention as described above utilizes a charge pump 16 in which the charge pump currents are balanced (i.e., equal and opposite). However, the current balance in the "UP" and "DOWN" control pulses can be altered in another embodiment to force the incoming LIMITED_CARRIER to track at a position other than in the exact middle of the two consecutive phases of the local oscillator.

Additionally, although the invention was described according to an embodiment which utilizes rising edge triggered D-type flip flops, it will be appreciated that other type flip flops or logic devices could be utilized. For example, falling edge triggered flip flops could be used as well as other types of flip flops such as S-R, JK, etc.

The present invention includes all such equivalents and modifications, and is limited only by the scope of the following claims.

What is claimed is:

1. A digital phase shift keyed carrier recovery and demodulator circuit, comprising:

an input for receiving an incoming phase modulated carrier;

a local oscillator for generating a reference frequency as a function of a control signal, the local oscillator providing as outputs a plurality of phases of the reference frequency;

a phase detector and feedback loop, operatively coupled to the input and the local oscillator, for comparing a phase of the incoming phase modulated carrier with the plurality of phases of the reference frequency, for producing the control signal based on the phase comparison initially to phase lock edges of any two consecutive phases of the plurality of phases to phase positions on respective sides of a corresponding edge of the incoming phase modulated carrier, and wherein the control signal as produced by the phase detector and feedback loop is thereafter generally insensitive to phase changes in the incoming phase modulated carrier due to data phase modulation; and a demodulation circuit for producing at least one output signal representing phase modulated bit data based on the outputs of the local oscillator and the incoming phase modulated carrier.

2. The demodulator circuit of claim 1, wherein:

the incoming phase modulated carrier is quaternary phase modulated;

the local oscillator provides four different output phases of the reference frequency spaced 90 degrees apart; and the phase detector and feedback loop compares the phase of the incoming phase modulated carrier to each of the four different output phases to produce the control signal.

3. A digital phase shift keyed carrier recovery and demodulator circuit, comprising:

an input for receiving an incoming phase modulated carrier;

a local oscillator for generating a reference frequency as a function of a control signal, the local oscillator providing as outputs a plurality of phases of the reference frequency;

a phase detector and feedback loop, operatively coupled to the input and the local oscillator, for comparing a phase of the incoming phase modulated carrier with the plurality of phases of the reference frequency, for producing the control signal based on the phase comparison initially to phase lock edges of any two consecutive phases of the plurality of phases to phase positions on respective sides of a corresponding edge of the incoming phase modulated carrier, and wherein the control signal as produced by the phase detector and feedback loop is thereafter generally insensitive to phase changes in the incoming phase modulated carrier due to data phase modulation; and a demodulation circuit for producing at least one output signal representing phase modulated bit data based on the outputs of the local oscillator and the incoming phase modulated carrier, wherein the incoming phase modulated carrier is quaternary phase modulated;

the local oscillator provides four different output phases of the reference frequency spaced 90 degrees apart;

the phase detector and feedback loop compares the phase of the incoming phase modulated carrier to each of the four different output phases to produce the control signal; and the phase detector and feedback loop comprises four flip flops, a respective one of the four flip flops being used to compare the phase of the incoming phase modulated carrier with respect to a corresponding one of the four different output phases.

4. The demodulator circuit of claim 3, wherein outputs of each of the four flip flops are logically combined.

5. The demodulator circuit of claim 4, wherein the phase detector and feedback loop comprises a charge pump which is driven by the logically combined outputs of the four flip flops, and a loop filter which filters the output of the charge pump to produce the control signal.

6. A digital phase shift keyed carrier recovery and demodulator circuit, comprising:

an input for receiving an incoming phase modulated carrier;

a local oscillator for generating a reference frequency as a function of a control signal, the local oscillator providing as outputs a plurality of phases of the reference frequency;

a phase detector and feedback loop, operatively coupled to the input and the local oscillator, for comparing a phase of the incoming phase modulated carrier with the plurality of phases of the reference frequency, for producing the control signal based on the phase comparison initially to phase lock edges of any two consecutive phases of the plurality of phases to phase positions on respective sides of a corresponding edge of the incoming phase modulated carrier, and wherein the control signal as produced by the phase detector and feedback loop is thereafter generally insensitive to phase changes in the incoming phase modulated carrier due to data phase modulation; and a demodulation circuit for producing at least one output signal representing phase modulated bit data based on the outputs of the local oscillator and the incoming phase modulated carrier, wherein the incoming phase modulated carrier is quaternary phase modulated;

the local oscillator provides four different output phases of the reference frequency spaced 90 degrees apart;

the phase detector and feedback loop compares the phase of the incoming phase modulated carrier to each of the four different output phases to produce the control signal; and the demodulation circuit comprises a pair of flip flops which are clocked by respective outputs of the local oscillator.

7. The demodulator circuit of claim 1, wherein:

the incoming phase modulated carrier is binary phase modulated;

the local oscillator provides two different output phases of the reference frequency spaced 180 degrees apart; and the phase detector and feedback loop compares the phase of the incoming phase modulated carrier to each of the two different output phases to produce the control signal.

8. A digital phase shift keyed carrier recovery and demodulator circuit, comprising:

an input for receiving an incoming phase modulated carrier;

a local oscillator for generating a reference frequency as a function of a control signal, the local oscillator providing as outputs a plurality of phases of the reference frequency;

a phase detector and feedback loop, operatively coupled to the input and the local oscillator, for comparing a phase of the incoming phase modulated carrier with the plurality of phases of the reference frequency, for producing the control signal based on the phase comparison initially to phase lock edges of any two consecutive phases of the plurality of phases to phase positions on respective sides of a corresponding edge of the incoming phase modulated carrier, and wherein the control signal as produced by the phase detector and feedback loop is thereafter generally insensitive to phase changes in the incoming phase modulated carrier due to data phase modulation; and a demodulation circuit for producing at least one output signal representing phase modulated bit data based on the outputs of the local oscillator and the incoming phase modulated carrier, wherein the incoming phase modulated carrier is binary phase modulated;

the local oscillator provides two different output phases of the reference frequency spaced 180 degrees apart;

the phase detector and feedback loop compares the phase of the incoming phase modulated carrier to each of the two different output phases to produce the control signal; and the phase detector and feedback loop comprises two flip flops, a respective one of the two flip flops being used to compare the phase of the incoming phase modulated carrier with respect to a corresponding one of the two different output phases.

9. The demodulator circuit of claim 8, wherein outputs of each of the two flip flops are logically combined.

10. The demodulator circuit of claim 9, wherein the phase detector and feedback loop comprises a charge pump which is driven by the logically combined outputs of the two flip flops, and a loop filter which filters the output of the charge pump to produce the control signal.

11. A digital phase shift keyed carrier recovery and demodulator circuit, comprising:

an input for receiving an incoming phase modulated carrier;

a local oscillator for generating a reference frequency as a function of a control signal, the local oscillator providing as outputs a plurality of phases of the reference frequency;

a phase detector and feedback loop, operatively coupled to the input and the local oscillator, for comparing a phase of the incoming phase modulated carrier with the plurality of phases of the reference frequency, for producing the control signal based on the phase comparison initially to phase lock edges of any two consecutive phases of the plurality of phases to phase positions on respective sides of a corresponding edge of the incoming phase modulated carrier, and wherein the control signal as produced by the phase detector and feedback loop is thereafter generally insensitive to phase changes in the incoming phase modulated carrier due to data phase modulation; and a demodulation circuit for producing at least one output signal representing phase modulated bit data based on the outputs of the local oscillator and the incoming phase modulated carrier, wherein the incoming phase modulated carrier is binary phase modulated;

the local oscillator provides two different output phases of the reference frequency spaced 180 degrees apart;

the phase detector and feedback loop compares the phase of the incoming phase modulated carrier to each of the two different output phases to produce the control signal; and the demodulation circuit comprises a flip flop which is clocked by an output of the local oscillator.

12. A digital phase shift keyed carrier recovery and demodulator circuit, comprising:

an input for receiving an incoming N phase modulated carrier, where N is an integer greater than or equal to 2;

a local oscillator for generating a reference frequency, the local oscillator providing as outputs at least N phases of the reference frequency;

a phase detector and feedback loop, operatively coupled to the input and the local oscillator, for synchronizing the local oscillator to the modulated carrier so as to maintain an initial phase relationship between corresponding edges of two consecutive phases of the N output phases and an edge of the modulated carrier in which the edge of the modulated carrier is generally centered in phase relationship between the corresponding edges of the two consecutive phases; and a demodulation circuit for producing at least one output signal representing phase modulated bit data by detecting subsequent changes in the phase of the modulated carrier based on a comparison of the modulated carrier and the outputs of the local oscillator.

13. The demodulator circuit of claim 12, wherein N=2.

14. The demodulator circuit of claim 12, wherein N=4.

15. A digital phase shift keyed carrier recovery and demodulator circuit, comprising:

an input for receiving an incoming N phase modulated carrier, where N is an integer greater than or equal to 2;

a local oscillator for generating a reference frequency, the local oscillator providing as outputs at least N phases of the reference frequency;

a phase detector and feedback loop, operatively coupled to the input and the local oscillator, for synchronizing the local oscillator to the modulated carrier so as to maintain an initial phase relationship between corresponding edges of two consecutive phases of the N output phases and an edge of the modulated carrier in which the edge of the modulated carrier is generally centered in phase relationship between the corresponding edges of the two consecutive phases; and a demodulation circuit for producing at least one output signal representing phase modulated bit data by detecting subsequent changes in the phase of the modulated carrier based on a comparison of the modulated carrier and the outputs of the local oscillator, wherein the phase detector and feedback loop comprises N flip flops for comparing the phase of the modulated carrier with a respective one of the N output phases.

16. The demodulator circuit of claim 15, wherein outputs from each of the N flip flops are logically combined and filtered to produce a control signal which controls the frequency and phase of the reference frequency.

17. The demodulator circuit of claim 15, wherein the N flip flops are D-type flip flops.

18. A method of phase shift keyed carrier recovery and demodulation, comprising the steps of:

receiving an incoming N phase modulated carrier, where N is an integer greater than or equal to 2;

generating a reference frequency, and providing at least N phases of the reference frequency;

synchronizing the reference frequency to the modulated carrier so as to maintain an initial phase relationship between corresponding edges of two consecutive phases of the N phases of the reference frequency and an edge of the modulated carrier in which the edge of the modulated carrier is generally centered in phase relationship between the corresponding edges of the two consecutive phases; and producing at least one output signal representing phase modulated bit data by detecting subsequent changes in the phase of the modulated carrier based on a comparison of the modulated carrier and the N phases of the reference frequency.

\* \* \* \* \*